(12) United States Patent
Kogo et al.

(10) Patent No.: US 9,677,452 B2
(45) Date of Patent: Jun. 13, 2017

(54) ABNORMALITY DIAGNOSIS DEVICE FOR EXHAUST GAS CONTROL APPARATUS

(71) Applicant: TOYOTA JIDOSHA KABUSHIKI KAISHA, Toyota-shi, Aichi-ken (JP)

(72) Inventors: Tomoyuki Kogo, Gotenba (JP); Makoto Ogiso, Mishima (JP); Taiga Hagimoto, Nagaizumi-cho (JP); Arifumi Matsumoto, Gotenba (JP); Kazuya Takaoka, Susono (JP); Hirokazu Nishijima, Susono (JP); Kenji Furui, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/894,063

(22) PCT Filed: May 29, 2014

(86) PCT No.: PCT/JP2014/064249
§ 371 (c)(1),
(2) Date: Nov. 25, 2015

(87) PCT Pub. No.: WO2014/192863
PCT Pub. Date: Dec. 4, 2014

(65) Prior Publication Data
US 2016/0115851 A1    Apr. 28, 2016

(30) Foreign Application Priority Data

May 30, 2013 (JP) .................................. 2013-113799

(51) Int. Cl.
*F01N 3/00* (2006.01)
*F01N 11/00* (2006.01)
(Continued)

(52) U.S. Cl.
CPC ............ *F01N 11/007* (2013.01); *F01N 3/208* (2013.01); *F01N 3/2066* (2013.01); *F01N 11/00* (2013.01);
(Continued)

(58) Field of Classification Search
USPC ......... 60/277, 278, 286, 295, 297, 301, 303; 123/568.11, 568.12, 568.21
See application file for complete search history.

(56) References Cited

U.S. PATENT DOCUMENTS 7,937,207 B2 * 5/2011 Nishiumi .............. F01N 3/0871
123/568.21
8,453,434 B2 * 6/2013 Yacoub ................... F01N 3/208
60/274

(Continued)

FOREIGN PATENT DOCUMENTS

JP    2010-159705    7/2010
JP    2010-248925    11/2010
(Continued)

*Primary Examiner* — Binh Q Tran
(74) *Attorney, Agent, or Firm* — Finnegan, Henderson, Farabow, Garrett & Dunner, LLP (57) ABSTRACT

An object of the invention is to suppress a reduction in accuracy of abnormality diagnosis with an abnormality diagnosis device for an exhaust gas control apparatus that performs the abnormality diagnosis regarding the exhaust gas control apparatus by using the amount of $NO_x$ flowing into an SCR catalyst as a parameter. In the abnormality diagnosis device for an exhaust gas control apparatus according to the invention provided with an exhaust gas control apparatus including the SCR catalyst, a supply device supplying ammonia to the exhaust gas control apparatus, an EGR device allowing some of exhaust gas to flow back to an intake passage from an exhaust passage further downstream than the supply device, acquiring means for acquiring a $NO_x$ inflow amount as the amount of $NO_x$ (Continued)

flowing into the exhaust gas control apparatus, and diagnostic means for diagnosing an abnormality of the exhaust gas control apparatus by using the $NO_x$ inflow amount acquired by the acquiring means as a parameter, the abnormality diagnosis regarding the exhaust gas control apparatus by the diagnostic means is prohibited in a case where the amount of the ammonia allowed to flow back along with the exhaust gas by the EGR device exceeds an upper limit value.

4 Claims, 7 Drawing Sheets (51) Int. Cl.
*F01N 3/20* (2006.01)
*F01N 13/00* (2010.01)
*F02M 26/06* (2016.01)

(52) U.S. Cl.
CPC ........... *F01N 13/009* (2014.06); *F02M 26/06* (2016.02); *F01N 2550/02* (2013.01); *F01N 2560/026* (2013.01); *F01N 2570/14* (2013.01); *F01N 2610/02* (2013.01); *F01N 2610/1453* (2013.01); *F01N 2900/08* (2013.01); *F01N 2900/1402* (2013.01); *F01N 2900/1616* (2013.01); *Y02T 10/24* (2013.01); *Y02T 10/47* (2013.01)

(56) References Cited

U.S. PATENT DOCUMENTS

| | | | | |
|---|---|---|---|---|
| 8,707,935 | B2* | 4/2014 | Weber | F02M 26/15 |
| | | | | 123/568.11 |
| 8,813,480 | B2* | 8/2014 | Hirota | F01N 3/208 |
| | | | | 60/286 |
| 9,255,542 | B2* | 2/2016 | Kurtz | F02D 41/403 |
| 9,273,640 | B2* | 3/2016 | Shinoda | F02D 41/0055 |
| 2011/0265463 | A1 | 11/2011 | Kojima et al. | |
| 2012/0240557 | A1 | 9/2012 | Kawaguchi et al. | |
| 2014/0130483 | A1 | 5/2014 | Miyake | |

FOREIGN PATENT DOCUMENTS

| | | |
|---|---|---|
| WO | WO 2011/070647 A1 | 6/2011 |
| WO | WO 2012/164713 A1 | 12/2012 |
| WO | WO 2014/192846 A1 | 12/2014 |

* cited by examiner

ABNORMALITY DIAGNOSIS DEVICE FOR EXHAUST GAS CONTROL APPARATUS

CROSS-REFERENCE TO RELATED APPLICATIONS

This application is a national phase application of International Application No. PCT/JP2014/064249, filed May 29, 2014, and claims the priority of Japanese Application No. 2013-113799, filed May 30, 2013, the content of both of which is incorporated herein by reference.

TECHNICAL FIELD

The invention relates to an abnormality diagnosis technique for an exhaust gas control apparatus that is disposed in an exhaust passage of an internal combustion engine.

BACKGROUND ART

PTL 1 discloses a configuration that is provided with a selective catalytic reduction (SCR) catalyst, an adding valve which adds urea water to exhaust gas flowing into the SCR catalyst, and a low-pressure EGR system which guides some of the exhaust gas (exhaust gas recirculation (EGR) gas) to an intake passage from an exhaust passage further downstream than the SCR catalyst.

PTL 2 discloses a configuration in which a spark ignition-type internal combustion engine is provided with a device that supplies ammonia to an intake passage and an SCR catalyst that is placed in an exhaust passage.

CITATION LIST

Patent Literature

PTL 1: International Publication No. 2012/164713
PTL 2: Japanese Patent Application Publication No. 2010-159705

SUMMARY OF THE INVENTION

A technique for diagnosing an abnormality of an exhaust gas control apparatus by the use of the amount of $NO_x$ flowing into an SCR catalyst (hereinafter, referred to as an "$NO_x$ inflow amount") as a parameter is known as a technique for detecting an abnormality of an exhaust gas control apparatus that includes an SCR catalyst and the like. For example, a method for calculating a $NO_x$ purification ratio of the SCR catalyst (a ratio of $NO_x$ removed by the SCR catalyst to the $NO_x$ inflow amount) by the use of the $NO_x$ inflow amount as a parameter and diagnosing an abnormality of the exhaust gas control apparatus based on a result of the calculation is known.

The $NO_x$ inflow amount and a $NO_x$ outflow amount are necessary during the calculation of the $NO_x$ purification ratio of the SCR catalyst. The $NO_x$ inflow amount and the $NO_x$ outflow amount may be calculated based on a value measured by a $NO_x$ sensor. In this case, however, two $NO_x$ sensors are necessary, and thus vehicle mountability is reduced while manufacturing costs increase. In this regard, a method for calculating only the $NO_x$ outflow amount by the use of the $NO_x$ sensor and estimating (calculating) the $NO_x$ inflow amount from an operation state of an internal combustion engine has been proposed.

In a vehicle in which the low-pressure EGR system is mounted as disclosed in PTL 1, a precursor of ammonia such as urea water or the ammonia is introduced into the internal combustion engine by the low-pressure EGR system in some cases. $NO_x$ such as nitrogen monoxide (NO) is generated when the ammonia precursor or the ammonia is used for combustion in the internal combustion engine. As a result, the amount of $NO_x$ actually discharged from the internal combustion engine, that is, the amount of $NO_x$ actually flowing into the SCR catalyst increases. In this case, the $NO_x$ inflow amount that is calculated from the operation state of the internal combustion engine falls short of the actual $NO_x$ inflow amount. The $NO_x$ outflow amount that is calculated by the use of the $NO_x$ sensor might considerably increase as a result of an increase in the actual $NO_x$ inflow amount. Accordingly, the $NO_x$ purification ratio that is calculated from a calculated value of the $NO_x$ inflow amount and the $NO_x$ outflow amount falls short of the actual $NO_x$ purification ratio, and an erroneous diagnosis in which the exhaust gas control apparatus is diagnosed to be abnormal despite the exhaust gas control apparatus being normal might ensue.

In the case of an increase in the $NO_x$ inflow amount derived from additive reflux in a configuration in which both the $NO_x$ inflow amount and the $NO_x$ outflow amount are calculated by the use of a $NO_x$ sensor, a difference between the $NO_x$ purification ratio in the case of normality and the $NO_x$ purification ratio in the case of abnormality decreases. When the value measured by the $NO_x$ sensor has an error in this case, it might be impossible to distinguish the $NO_x$ purification ratio in the case of normality and the $NO_x$ purification ratio in the case of abnormality from each other.

An object of the invention, which has been made in view of the different circumstances described above, is to suppress a reduction in accuracy of abnormality diagnosis with an abnormality diagnosis device for an exhaust gas control apparatus provided with an exhaust gas control apparatus including a selective catalytic reduction catalyst, a supply device supplying an additive to the exhaust gas control apparatus, the additive being ammonia or a precursor of the ammonia, an EGR device guiding some of exhaust gas to an intake passage from an exhaust passage further downstream than a position of the supply of the additive, and diagnostic means for performing abnormality diagnosis on the exhaust gas control apparatus by using the $NO_x$ inflow amount as a parameter.

In order to achieve the above-described object, the invention provides an abnormality diagnosis device for an exhaust gas control apparatus including an exhaust gas control apparatus placed in an exhaust passage of an internal combustion engine and provided with a selective catalytic reduction catalyst, a supply device supplying an additive to the exhaust gas control apparatus, the additive being ammonia or a precursor of the ammonia, an EGR device allowing some of exhaust gas to flow back from the exhaust passage to an intake passage, the exhaust passage being further downstream than a position of the supply of the additive by the supply device, acquiring means for acquiring a $NO_x$ inflow amount, the $NO_x$ inflow amount being the amount of $NO_x$ flowing into the exhaust gas control apparatus, and diagnostic means for diagnosing an abnormality of the exhaust gas control apparatus by using the $NO_x$ inflow amount acquired by the acquiring means as a parameter, in which the abnormality diagnosis regarding the exhaust gas control apparatus is prohibited in a case where the amount of the additive that is the ammonia or the precursor of the ammonia allowed to flow back along with the exhaust gas by the EGR device is large.

Specifically, the abnormality diagnosis device for an exhaust gas control apparatus according to the invention includes: the exhaust gas control apparatus placed in the exhaust passage of the internal combustion engine and provided with the selective catalytic reduction catalyst; the supply device supplying the additive to the exhaust gas control apparatus, the additive being the ammonia or the precursor of the ammonia; the EGR device allowing the some of the exhaust gas to flow back from the exhaust passage to the intake passage, the exhaust passage being further downstream than the position of the supply of the additive by the supply device; the acquiring means for acquiring the $NO_x$ inflow amount, the $NO_x$ inflow amount being the amount of $NO_x$ flowing into the exhaust gas control apparatus; the diagnostic means for diagnosing the abnormality of the exhaust gas control apparatus by using the $NO_x$ inflow amount acquired by the acquiring means as the parameter; and prohibiting means for prohibiting the abnormality diagnosis regarding the exhaust gas control apparatus by the diagnostic means in a case where the some of the exhaust gas is allowed to flow back by the EGR device and the amount of the additive flowing back along with the exhaust gas exceeds an upper limit value.

A physical quantity such as a $NO_x$ purification ratio and a $NO_x$ purification amount (the amount of $NO_x$ removed by the exhaust gas control apparatus) can be regarded as an index showing a $NO_x$ purification performance of the exhaust gas control apparatus. Accordingly, in a case where the abnormality diagnosis regarding the exhaust gas control apparatus is performed by the use of the $NO_x$ inflow amount as a parameter, a method of calculating the physical quantity described above by the use of the $NO_x$ inflow amount as a parameter and comparing a result of the calculation to a threshold is used.

When some of the exhaust gas (EGR gas) is allowed to flow back by the EGR device, some of the additive supplied from the supply device might flow back along with the EGR gas. In this case, the additive is used for combustion in the internal combustion engine along with an air-fuel mixture. When the additive is used for the combustion, the ammonia is oxidized and $NO_x$ such as nitrogen monoxide is generated. As a result, a larger amount of $NO_x$ flows out from the internal combustion engine (that is, a larger amount of $NO_x$ flows into the exhaust gas control apparatus) in a case where some of the additive is allowed to flow back along with the EGR gas than in a case where the reflux does not occur.

In a case where the $NO_x$ inflow amount that is used in the abnormality diagnosis processing regarding the exhaust gas control apparatus is calculated by the use of a parameter which shows an operation state of the internal combustion engine (such as the amount of suctioned air, a fuel injection quantity, a fuel injection timing, and an engine rotation speed), a calculated value thereof (hereinafter, referred to as a "calculated $NO_x$ inflow amount value") falls short of an actual $NO_x$ inflow amount (hereinafter, referred to as an "actual $NO_x$ inflow amount"). As a result, when the physical quantity described above is calculated by the use of the calculated $NO_x$ inflow amount value calculated by the acquiring means as a parameter, a correlation between a result of the calculation and the $NO_x$ purification performance of the exhaust gas control apparatus decreases. In a case where the $NO_x$ purification ratio is used as an index that shows the $NO_x$ purification performance of the exhaust gas control apparatus, for example, the $NO_x$ purification ratio that is calculated by the use of the calculated $NO_x$ inflow amount value as a parameter might fall short of an actual $NO_x$ purification ratio. In addition, in a case where the $NO_x$ purification amount is used as an index that shows the $NO_x$ purification performance of the exhaust gas control apparatus, the $NO_x$ purification amount that is calculated by the use of the calculated $NO_x$ inflow amount value as a parameter might fall short of an actual $NO_x$ purification amount.

Accordingly, when the abnormality diagnosis processing using the calculated $NO_x$ inflow amount value is performed during the EGR gas reflux by the EGR device, an erroneous diagnosis in which the exhaust gas control apparatus is diagnosed to be abnormal despite the exhaust gas control apparatus being normal might occur.

Such an index (physical quantity) also increases when the $NO_x$ inflow amount increases due to the reflux of the additive and the EGR gas in a case where the $NO_x$ inflow amount that is used in the abnormality diagnosis processing regarding the exhaust gas control apparatus is calculated from a value measured by a $NO_x$ sensor. This tendency can be witnessed even in a case where the exhaust gas control apparatus is abnormal. Accordingly, in a case where the actual $NO_x$ inflow amount increases due to the reflux of the additive and the EGR gas, a difference between an index (physical quantity) pertaining to a case where the exhaust gas control apparatus is normal and an index (physical quantity) pertaining to a case where the exhaust gas control apparatus is abnormal is reduced. When a measurement error of the $NO_x$ sensor is taken into account in this case, the difference between the index (physical quantity) pertaining to a case where the exhaust gas control apparatus is normal and the index (physical quantity) pertaining to a case where the exhaust gas control apparatus is abnormal might be further reduced or a range that the index (physical quantity) can have when the exhaust gas control apparatus is normal and a range that the index (physical quantity) can have when the exhaust gas control apparatus is abnormal might overlap each other. As a result, it might be difficult to accurately perform the abnormality diagnosis regarding the exhaust gas control apparatus.

In contrast, the diagnostic means of the abnormality diagnosis device for an exhaust gas control apparatus according to the invention does not perform the abnormality diagnosis regarding the exhaust gas control apparatus in a case where the amount of the additive that flows back along with the EGR gas exceeds the upper limit value. The "upper limit value" is a minimum amount at which it is considered that an erroneous diagnosis occurs or an amount which is obtained by subtracting a margin from the minimum amount. The upper limit value is a value that is determined in advance through appropriate processing using an experiment or the like.

According to the abnormality diagnosis device for an exhaust gas control apparatus provided with the prohibiting means, the abnormality diagnosis is not executed in a case where the actual $NO_x$ inflow amount increases due to reducing agent reflux. As a result, an erroneous diagnosis such as the above-described erroneous diagnosis becomes less likely to occur. Accordingly, a reduction in diagnostic accuracy that is attributable to the reflux of the additive and the EGR gas can be suppressed.

In a case where the EGR device is configured to allow the EGR gas to flow back to the intake passage from the exhaust passage further downstream than the exhaust gas control apparatus, the amount of the additive that flows back along with the EGR gas can be calculated by the use of the amount of the additive slipping from the exhaust gas control apparatus (hereinafter, referred to as a "slip amount") and a ratio of the amount of the exhaust gas flowing back as the EGR gas to the amount of the exhaust gas flowing out from the exhaust gas control apparatus (corresponding to an EGR ratio) as parameters. The prohibiting means may calculate an additive reflux amount by using the above-described parameter, and may prohibit the abnormality diagnosis regarding the exhaust gas control apparatus by the diagnostic means in a case where a result of the calculation exceeds the upper limit value.

The additive slip amount can be calculated by the use of a temperature of the selective catalytic reduction catalyst, a flow rate of the exhaust gas passing through the selective catalytic reduction catalyst, and the amount of ammonia adsorbed on the selective catalytic reduction catalyst as parameters. For example, the additive slip amount is larger when the temperature of the selective catalytic reduction catalyst is high than when the temperature of the selective catalytic reduction catalyst is low. The additive slip amount is larger when the flow rate of the exhaust gas passing through the selective catalytic reduction catalyst is high than when the flow rate of the exhaust gas passing through the selective catalytic reduction catalyst is low. The additive slip amount is larger when the amount of ammonia adsorbed on the selective catalytic reduction catalyst is large than when the amount of ammonia adsorbed on the selective catalytic reduction catalyst is small. A map or a function that shows a relationship among the temperature of the selective catalytic reduction catalyst, the flow rate of the exhaust gas passing through the selective catalytic reduction catalyst, the amount of ammonia adsorbed on the selective catalytic reduction catalyst, and the additive slip amount may be obtained based on these tendencies and the additive slip amount may be obtained based on the map or the function.

In a case where the EGR device is configured to allow the EGR gas to flow back to the intake passage from the exhaust passage further downstream than the position of the supply of the additive and further upstream than the exhaust gas control apparatus, the additive reflux amount can be calculated by the use of an additive supply amount and the EGR ratio as parameters. The prohibiting means may calculate the additive reflux amount by using the additive supply amount and the EGR ratio as parameters, and may prohibit the abnormality diagnosis regarding the exhaust gas control apparatus by the diagnostic means in a case where a result of the calculation exceeds the upper limit value.

According to the invention, a reduction in accuracy of abnormality diagnosis can be suppressed with an abnormality diagnosis device for an exhaust gas control apparatus including an exhaust gas control apparatus provided with a selective catalytic reduction catalyst, a supply device supplying an additive to the exhaust gas control apparatus, the additive being ammonia or a precursor of the ammonia, an EGR device guiding some of exhaust gas to an intake passage from an exhaust passage further downstream than a position of the supply of the additive, acquiring means for acquiring a $NO_x$ inflow amount that is the amount of $NO_x$ flowing into the exhaust gas control apparatus, and diagnostic means for performing the abnormality diagnosis regarding the exhaust gas control apparatus by using the $NO_x$ inflow amount acquired by the acquiring means as a parameter.

MODES FOR CARRYING OUT THE INVENTION

Hereinafter, specific embodiments of the invention will be described with reference to accompanying drawings. The dimensions, materials, shapes, relative arrangements, and the like of the component parts described below in the embodiments do not limit the technical scope of the invention unless otherwise specified.

Figure 1:
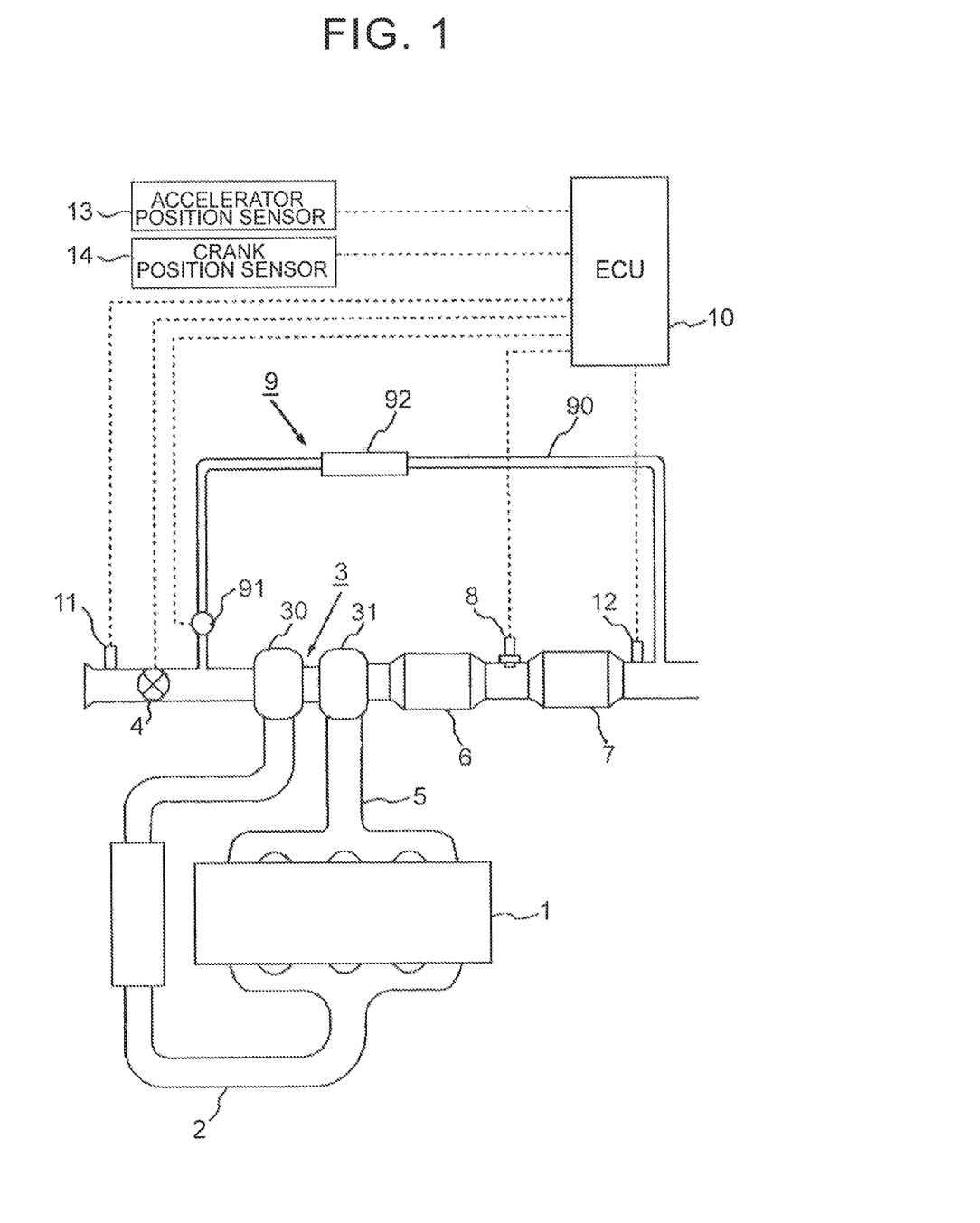
FIG. 1 is a drawing illustrating a schematic configuration of an internal combustion engine to which the invention is applied and intake and exhaust systems thereof.

FIG. 1 is a drawing illustrating a schematic configuration of an internal combustion engine to which the invention is applied and intake and exhaust systems thereof. The internal combustion engine 1 that is illustrated in FIG. 1 is a compression ignition-type internal combustion engine that uses light oil as a main fuel (diesel engine) or a spark ignition-type internal combustion engine that uses gasoline as a main fuel (gasoline engine).

An intake passage 2 is connected to the internal combustion engine 1. The intake passage 2 is a passage that guides fresh air (air) from the atmosphere to the internal combustion engine 1. A compressor 30 of a centrifugal turbocharger (turbocharger) 3 is placed in the middle of the intake passage 2. In the intake passage 2 further upstream than the compressor 30, an intake throttle valve 4, which changes a passage cross-sectional area of the intake passage 2, is placed.

An exhaust passage 5 is connected to the internal combustion engine 1. The exhaust passage 5 is a passage that guides gas (exhaust gas) combusted in a cylinder of the internal combustion engine 1 to an exhaust gas control apparatus (described later), a muffler (not illustrated), and the like. A turbine 31 of the turbocharger 3 is placed in the middle of the exhaust passage 5. In the exhaust passage 5, a first catalyst casing 6 is placed further downstream than the turbine 31.

The first catalyst casing 6 accommodates a particulate filter, an oxidation catalyst, and the like in a tubular casing. The first catalyst casing 6 may accommodate a three-way catalyst or an occlusion reduction catalyst instead of the oxidation catalyst. In this case, the three-way catalyst or the occlusion reduction catalyst may be supported by the particulate filter.

In the exhaust passage 5, a second catalyst casing 7 is placed further downstream than the first catalyst casing 6. The second catalyst casing 7 accommodates a selective catalytic reduction catalyst (SCR catalyst), an oxidation catalyst, and the like in a tubular casing. The second catalyst casing 7 may accommodate a particulate filter where an SCR catalyst is supported. In this case, the oxidation catalyst may be accommodated in the second catalyst casing 7 without the first catalyst casing 6 accommodating the oxidation catalyst or without the first catalyst casing 6 being disposed. The second catalyst casing 7 that has the above-described configuration corresponds to the exhaust gas control apparatus according to the invention.

In the exhaust passage 5, an adding valve 8 is attached between the first catalyst casing 6 and the second catalyst casing 7. The adding valve 8 is an injection valve that injects an additive, which is ammonia or a precursor of the ammonia, into the exhaust passage 5. An aqueous solution of urea, ammonium carbamate, or the like can be used as the precursor of the ammonia. In this embodiment, a urea water solution is used as the precursor of the ammonia. The adding valve 8 corresponds to the supply device according to the invention. In a case where the first catalyst casing 6 accommodates the three-way catalyst or the occlusion reduction catalyst, ammonia can be generated in the three-way catalyst or the occlusion reduction catalyst when the exhaust gas that flows into the first catalyst casing 6 has a rich atmosphere.

The urea water solution that is injected into the exhaust passage 5 from the adding valve 8 flows into the second catalyst casing 7 along with the exhaust gas. In this case, the urea water solution is thermally decomposed by receiving heat of the exhaust gas or is hydrolyzed by the SCR catalyst. Ammonia is generated when the urea water solution is thermally decomposed or hydrolyzed. The ammonia that is generated in this manner is adsorbed onto or occluded by the SCR catalyst. After the adsorption onto or occlusion by the SCR catalyst, the ammonia generates nitrogen and water through a reaction with $NO_x$ contained in the exhaust gas. In other words, the ammonia functions as a $NO_x$ reducing agent.

A base end of an EGR passage 90 is connected to the exhaust passage 5 further downstream than the second catalyst casing 7. A termination end of the EGR passage 90 is connected to the intake passage 2 further downstream than the intake throttle valve 4 and further upstream than the compressor 30. The EGR passage 90 is a passage that guides some of the exhaust gas (EGR gas) from the exhaust passage 5 to the intake passage 2.

An EGR valve 91 and an EGR cooler 92 are placed in the middle of the EGR passage 90. The EGR valve 91 is a valve mechanism that changes a passage cross-sectional area of the EGR passage 90 and is a valve mechanism that adjusts the amount of the EGR gas which flows through the EGR passage 90. The EGR cooler 92 is an instrument that cools the EGR gas which flows through the EGR passage 90. For example, the EGR cooler 92 is a heat exchanger that performs heat exchange between cooling water or outside air and the EGR gas. The EGR passage 90, the EGR valve 91, and the EGR cooler 92 are elements constituting an EGR device 9.

An ECU 10 is also disposed in the internal combustion engine 1 that has the above-described configuration. The ECU 10 is an electronic control unit that is configured to have a CPU, a ROM, a RAM, a backup RAM, and the like. The ECU 10 is electrically connected to various sensors such as an air flow meter 11, a $NO_x$ sensor 12, an accelerator position sensor 13, and a crank position sensor 14.

The air flow meter 11 is placed in the intake passage 2 further upstream than the intake throttle valve 4. The air flow meter 11 outputs an electrical signal that has a correlation with the amount (mass) of air which flows through the intake passage 2. The $NO_x$ sensor 12 is attached to the exhaust passage 5 further downstream than the second catalyst casing 7. The $NO_x$ sensor 12 outputs an electrical signal that has a correlation with a $NO_x$ concentration of the exhaust gas which flows out from the second catalyst casing 7. The accelerator position sensor 13 outputs an electrical signal that has a correlation with the amount of operation of an accelerator pedal (accelerator opening degree, the accelerator pedal not illustrated herein). The crank position sensor 14 outputs an electrical signal that has a correlation with a rotational position of an output shaft (crankshaft) of the internal combustion engine 1.

The ECU 10 is electrically connected to various instruments such as a fuel injection valve (not illustrated) as well as the intake throttle valve 4, the adding valve 8, and the EGR valve 91 described above. The ECU 10 electrically controls these instruments based on the output signals of the sensors.

For example, the ECU 10 calculates an engine load and an engine rotation speed from the output signals of the accelerator position sensor 13 and the crank position sensor 14 and controls a fuel injection quantity and a fuel injection timing in accordance with the results of the calculation. In addition, the ECU 10 diagnoses an abnormality of the SCR catalyst by using the amount of $NO_x$ that flows into the SCR catalyst which is accommodated in the second catalyst casing 7 ($NO_x$ inflow amount) as a parameter.

Hereinafter, a method for diagnosing the abnormality of the SCR catalyst will be described. Firstly, the ECU 10 calculates the amount of $NO_x$ that is discharged from the internal combustion engine 1 (that is, the amount of $NO_x$ that flows into the SCR catalyst in the second catalyst casing 7 ($NO_x$ inflow amount)) based on a parameter showing an operation state of the internal combustion engine 1.

The amount of $NO_x$ that is discharged from the internal combustion engine 1 has a correlation with the amount of $NO_x$ that is generated during the combustion of an air-fuel mixture in the internal combustion engine 1. The amount of $NO_x$ that is generated during the combustion of the air-fuel mixture in the internal combustion engine 1 has a correlation with the amount of oxygen contained in the air-fuel mixture, the amount of fuel contained in the air-fuel mixture, the fuel injection timing, and the engine rotation speed. The amount of oxygen contained in the air-fuel mixture has a correlation with the amount of suctioned air (output signal of the air flow meter 11). The amount of fuel contained in the air-fuel mixture has as correlation with the fuel injection quantity. Accordingly, the ECU 10 can calculate the $NO_x$ inflow amount by using the output signal of the air flow meter 11, the fuel injection quantity, the fuel injection timing, and the engine rotation speed as parameters. A relationship between these parameters and the $NO_x$ inflow amount may be experimentally obtained in advance and stored in the ROM of the ECU 10 in the form of a map and a function formula. The acquiring means according to the invention is realized by the ECU 10 calculating the $NO_x$ inflow amount as described above.

The ECU 10 calculates a physical quantity representing a $NO_x$ purification performance of the SCR catalyst by using a calculated value of the $NO_x$ inflow amount (calculated $NO_x$ inflow amount value) as a parameter and diagnoses the abnormality of the SCR catalyst based on the result of the calculation. A $NO_x$ purification ratio of the SCR catalyst, a $NO_x$ purification amount of the SCR catalyst, or the like can be used as the physical quantity representing the $NO_x$ purification performance of the SCR catalyst. In the following description, an example in which the $NO_x$ purification ratio is used as the physical quantity representing the $NO_x$ purification performance of the SCR catalyst will be described. The $NO_x$ purification ratio is the ratio of the amount of $NO_x$ removed by the SCR catalyst to the amount of $NO_x$ flowing into the SCR catalyst. The $NO_x$ purification ratio can be calculated based on the following Equation (1).

$$Enox=(Anoxin-Anoxout)/Anoxin) \qquad (1)$$

In Equation (1), Enox is the $NO_x$ purification ratio. Anoxin is the $NO_x$ inflow amount that is substituted with the calculated $NO_x$ inflow amount value calculated by the above-described method. Anoxout is a $NO_x$ outflow amount that is substituted with a value which is obtained by the multiplication of the output signal of the $NO_x$ sensor 12 ($NO_x$ concentration) and an exhaust gas flow rate per unit time (sum total of the amount of suctioned air per unit time and the injection quantity per unit time).

After the calculation of the $NO_x$ purification ratio Enox based on the above-described Equation (1), the ECU 10 determines whether or not the $NO_x$ purification ratio Enox is equal to or higher than a threshold. This "threshold" is the lowest $NO_x$ purification ratio pertaining to a case where the SCR catalyst is normal or a value obtained by adding a margin to that $NO_x$ purification ratio. When the $NO_x$ purification ratio Enox is equal to or higher than the threshold, the ECU 10 diagnoses that the SCR catalyst is normal. When the $NO_x$ purification ratio Enox is lower than the threshold, the ECU 10 diagnoses that the SCR catalyst is abnormal. The diagnostic means according to the invention is realized by the ECU 10 executing the SCR catalyst abnormality diagnosis processing as described above by using the calculated $NO_x$ inflow amount value as a parameter.

An erroneous diagnosis might be caused when the SCR catalyst abnormality diagnosis processing is executed during the reflux of some of the exhaust gas from the exhaust passage 5 to the intake passage 2 by the EGR device 9, more specifically, while some of the exhaust gas allowed to flow back by the EGR device 9 (EGR gas) flows back into the SCR catalyst and some of the ammonia in the SCR catalyst slips out.

When some of the ammonia slips from the SCR catalyst during the reflux of the EGR gas, the slipping ammonia is suctioned into the internal combustion engine 1 along with the EGR gas. The ammonia that is suctioned into the internal combustion engine 1 is used for combustion along with the air-fuel mixture. In this case, the ammonia comes into contact with oxygen at a high temperature, and thus the ammonia is oxidized and $NO_x$ such as nitrogen monoxide is generated. As a result, a larger amount of $NO_x$ is discharged from the internal combustion engine 1 in a case where the ammonia is suctioned into the internal combustion engine 1 along with the EGR gas than in a case where the suctioning does not occur.

Figure 2:
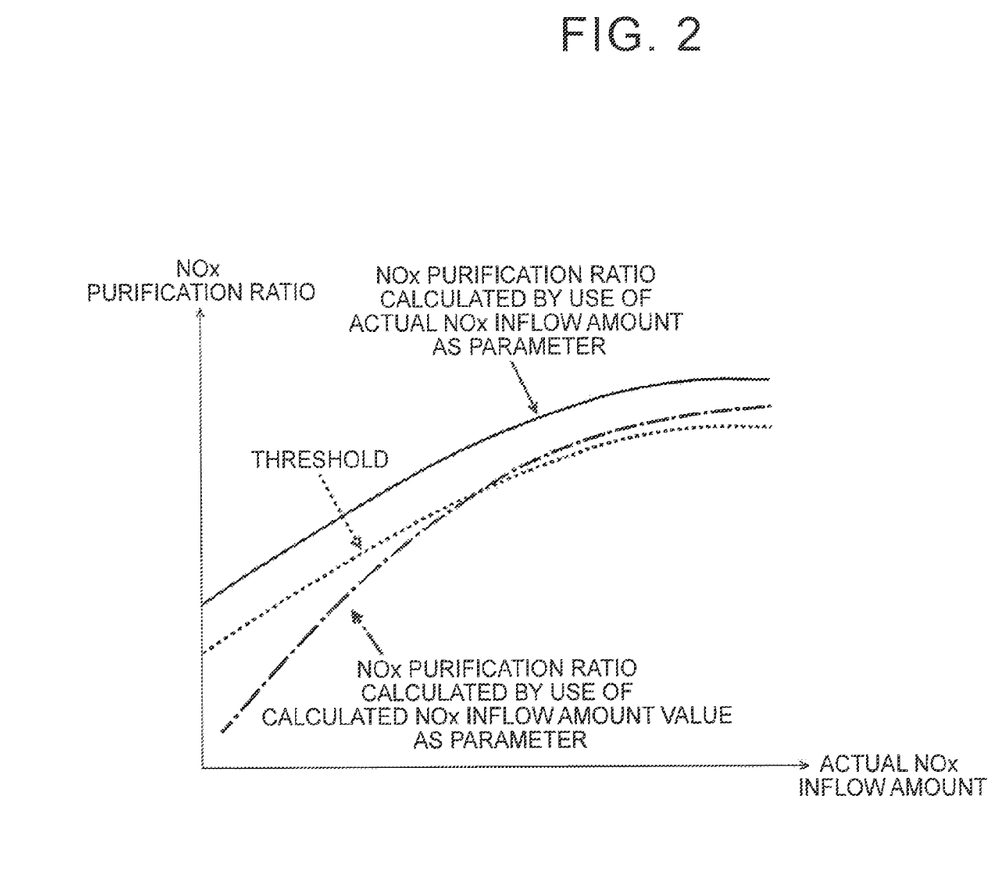
FIG. 2 is a drawing illustrating a relationship between an actual $NO_x$ inflow amount and a $NO_x$ purification ratio.

In a case where the amount of $NO_x$ that is discharged from the internal combustion engine 1 increases for the above-described reason, an error occurs between the calculated $NO_x$ inflow amount value and an actual $NO_x$ inflow amount. In addition, in a case where the actual $NO_x$ inflow amount increases, the amount of $NO_x$ not removed by the SCR catalyst might increase and the $NO_x$ outflow amount might increase. In a case where the amount of the urea water solution injected from the adding valve 8 is adjusted based on the calculated $NO_x$ inflow amount value, in particular, the amount of the urea water solution injected from the adding valve 8 falls short of an amount suitable for the actual $NO_x$ inflow amount, and thus the $NO_x$ outflow amount increases. As a result, the $NO_x$ purification ratio Enox that is calculated based on the above-described Equation (1) might fall short of the threshold, even in a case where the SCR catalyst is normal, as illustrated in FIG. 2. The solid line in FIG. 2 represents the $NO_x$ purification ratio that is calculated based on the use of the actual $NO_x$ inflow amount as a parameter and the one-dot chain line in FIG. 2 represents the $NO_x$ purification ratio that is calculated based on the use of the calculated $NO_x$ inflow amount value as a parameter. The dotted line in FIG. 2 represents the threshold.

An abnormality diagnosis device for an exhaust gas control apparatus according to this embodiment does not execute the abnormality diagnosis regarding the second catalyst casing 7 in a case where the amount of ammonia that flows back along with the EGR gas (hereinafter, referred to as an "ammonia reflux amount") exceeds an upper limit value in an EGR gas reflux situation. The upper limit value is a minimum ammonia reflux amount at which it is considered that an erroneous diagnosis can occur or an amount which is obtained by subtracting a margin from the minimum ammonia reflux amount. The upper limit value is a value that is determined in advance through appropriate processing using an experiment or the like.

Figure 3:
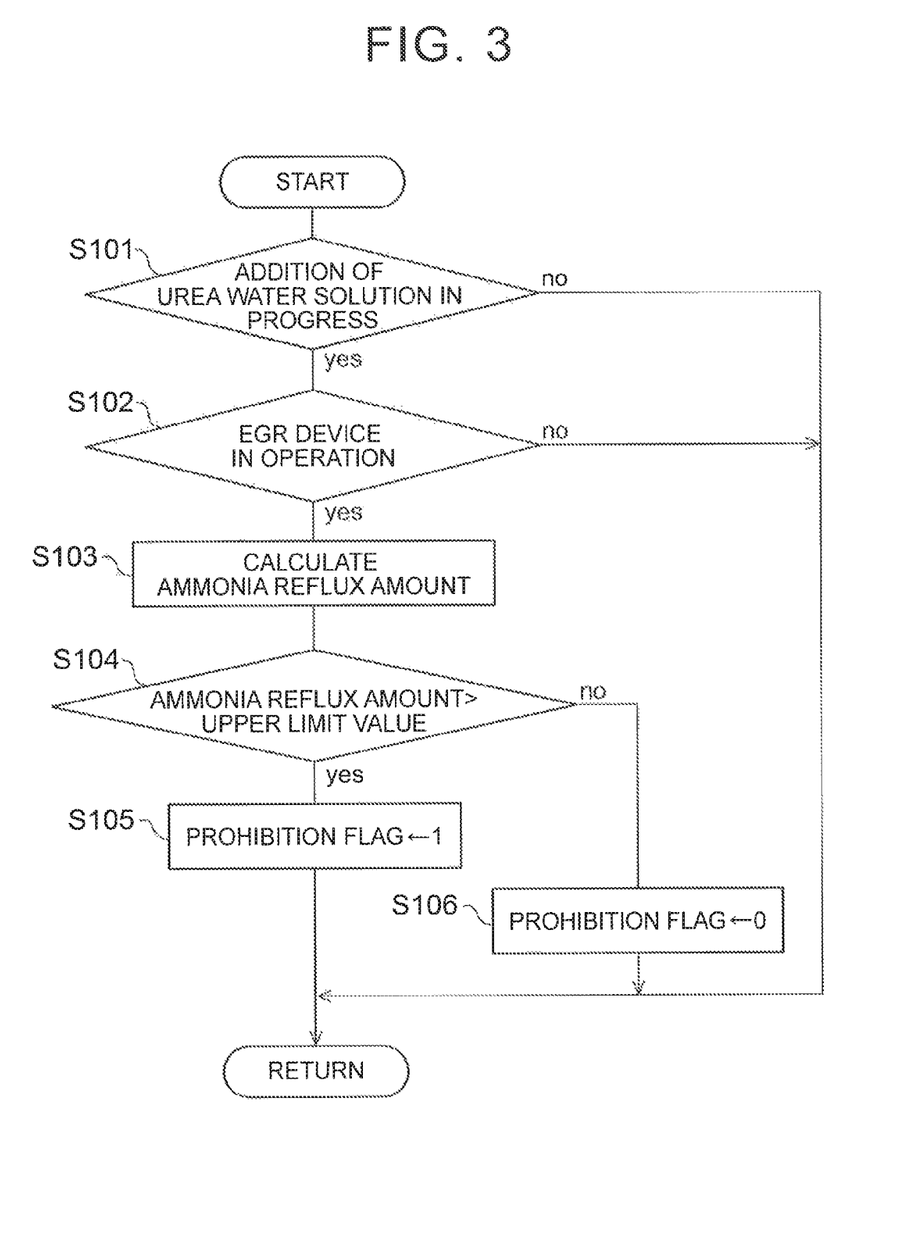
FIG. 3 is a flowchart illustrating a processing routine that an ECU executes when determining whether or not to prohibit abnormality diagnosis.

Hereinafter, an abnormality diagnosis prohibition procedure will be described with reference to FIG. 3. FIG. 3 is a flowchart illustrating a processing routine that the ECU 10 executes when determining whether or not to prohibit the abnormality diagnosis. This processing routine is a routine that is stored in advance in the ROM of the ECU 10 and is periodically executed by the ECU 10 (CPU).

In the processing of S101, which is the first stage of the processing routine that is illustrated in FIG. 3, the ECU 10 determines whether or not the injection of the urea water solution by the adding valve 8 is in progress. In the case of a negative determination in the processing of S101, the ammonia is not suctioned into the internal combustion engine 1 along with the EGR gas or a small amount of ammonia is suctioned into the internal combustion engine 1 along with the EGR gas despite the desorption of a certain amount of ammonia from the SCR catalyst, and thus the ECU 10 terminates the execution of this routine without prohibiting the abnormality diagnosis. The ECU 10 allows the processing to proceed to S102 in the case of a positive determination in the processing of S101.

In the processing of S102, the ECU 10 determines whether or not the EGR device 9 is in operation, that is, whether or not some of the exhaust gas (EGR gas) is subjected to the reflux from the exhaust passage 5 to the intake passage 2 by the EGR device 9. Specifically, the ECU 10 makes a negative determination when the EGR valve 91 has a zero opening degree (fully closed) and makes a positive determination when the opening degree of the EGR valve 91 exceeds zero. In the case of a negative determination in the processing of S102, the abnormality diagnosis does not have to be prohibited because the ammonia slipping out from the SCR catalyst is not suctioned into the internal combustion engine 1. Accordingly, the ECU 10 terminates the execution of this routine in the case of a negative determination in the processing of S102.

In the case of a negative determination in the processing of S101 and in the case of a negative determination in the processing of S102, the ECU 10 executes the abnormality diagnosis processing regarding the exhaust gas control apparatus based on the calculated $NO_x$ inflow amount value.

In the case of a positive determination in the processing of S102, the ammonia slipping out from the SCR catalyst might be suctioned into the internal combustion engine 1. In this case, the ECU 10 allows the processing to proceed to S103 and calculates the amount of ammonia flowing back along with the EGR gas (ammonia reflux amount). In the first step of this calculation, the ECU 10 calculates the amount of ammonia flowing out from the SCR catalyst, that is, an ammonia slip amount Anh3slp. The ammonia slip amount Anh3slp is calculated by the use of a flow rate of the exhaust gas, a temperature of the SCR catalyst, and an ammonia adsorption amount of the SCR catalyst as parameters.

Figure 4:
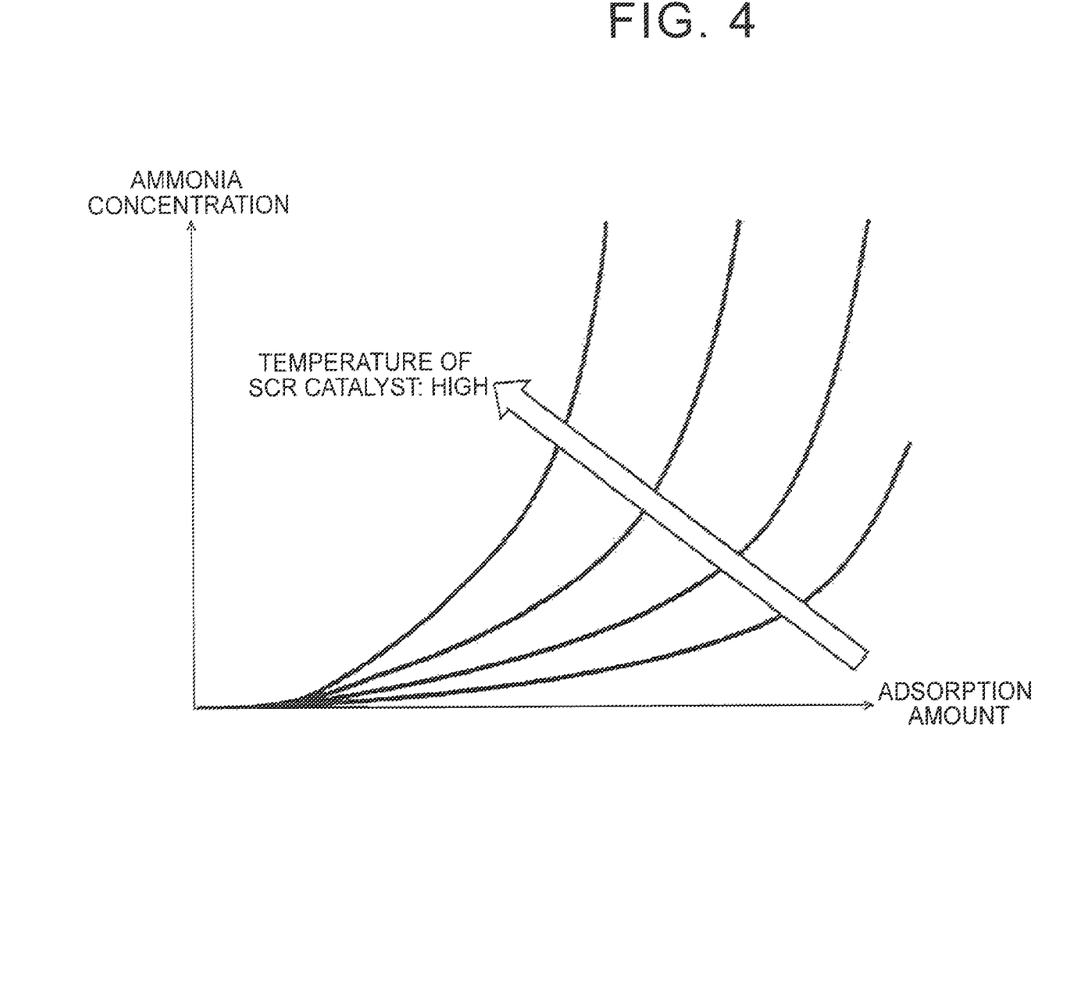
FIG. 4 is a drawing illustrating a relationship among an ammonia adsorption amount of an SCR catalyst, a temperature of the SCR catalyst, and a slip amount of ammonia.

FIG. 4 is a drawing illustrating a relationship among the amount of ammonia adsorbed on the SCR catalyst (adsorption amount), the temperature of the SCR catalyst, and an ammonia concentration of the exhaust gas flowing out from the SCR catalyst pertaining to a case where the exhaust gas that flows through the SCR catalyst has a constant flow rate. In FIG. 4, the ammonia concentration of the exhaust gas flowing out from the SCR catalyst increases as the ammonia adsorption amount of the SCR catalyst increases and increases as the temperature of the SCR catalyst increases. Accordingly, it can be said that an ammonia slip amount increases as the ammonia adsorption amount of the SCR catalyst increases and the temperature of the SCR catalyst increases in a case where the exhaust gas that flows through the SCR catalyst has a constant flow rate.

When the exhaust gas that flows out from the SCR catalyst has a constant ammonia concentration, the slip amount per unit time increases as the flow rate per unit time of the exhaust gas flowing through the SCR catalyst increases. Accordingly, the ammonia slip amount increases as the flow rate per unit time of the exhaust gas flowing through the SCR catalyst increases.

In this embodiment, the ammonia concentration of the exhaust gas flowing out from the SCR catalyst is obtained based on the relationship that is illustrated in FIG. 4 and the ammonia slip amount Anh3slp is obtained by the ammonia concentration being multiplied by the exhaust gas flow rate per unit time (sum total of the amount of suctioned air per unit time and the fuel injection quantity per unit time).

The ammonia adsorption amount that is used when the ammonia slip amount Anh3slp is obtained can be estimated by an appropriate method. For example, the ammonia adsorption amount can be obtained by subtracting the amount of ammonia consumed in the SCR catalyst (the amount of ammonia consumed for $NO_x$ reduction) and the slip amount from the amount of ammonia flowing into the SCR catalyst.

Figure 5:
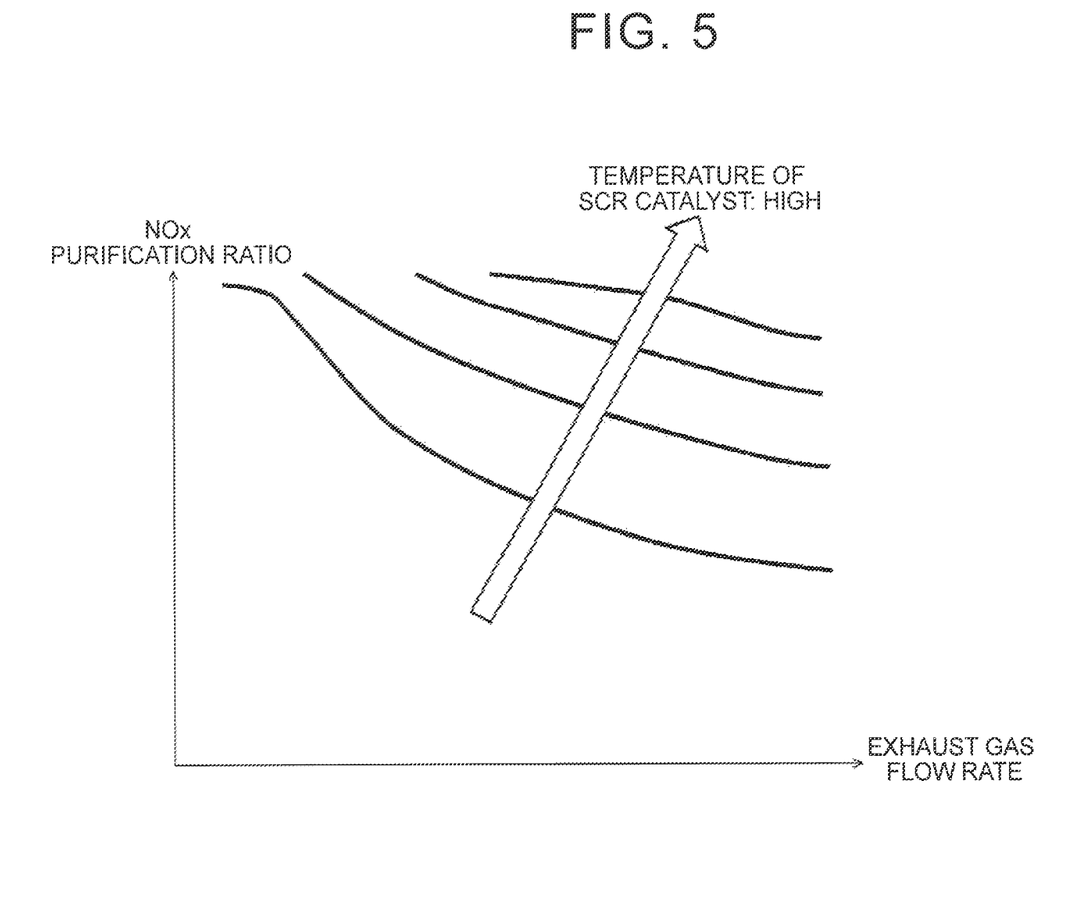
FIG. 5 is a drawing illustrating a relationship among a flow rate of exhaust gas that passes through the SCR catalyst, the temperature of the SCR catalyst, and the $NO_x$ purification ratio.

The amount of ammonia consumed in the SCR catalyst is calculated by the use of the $NO_x$ inflow amount and the $NO_x$ purification ratio as parameters. In this case, the calculated $NO_x$ inflow amount value is used as the $NO_x$ inflow amount. The $NO_x$ purification ratio may be obtained by a method similar to that for the $NO_x$ purification ratio which is used in the abnormality diagnosis processing regarding the exhaust gas control apparatus or may be estimated by the use of the flow rate of the exhaust gas flowing into the SCR catalyst (sum total of the amount of suctioned air per unit time and the fuel injection quantity per unit time) and the temperature of the SCR catalyst as parameters. For example, the $NO_x$ purification ratio that is used in ammonia consumption amount calculation can be estimated based on the relationship which is illustrated in FIG. 5. FIG. 5 is a drawing illustrating a relationship among the exhaust gas flow rate (sum total of the amount of suctioned air per unit time and the fuel injection quantity per unit time), the temperature of the SCR catalyst, and the $NO_x$ purification ratio. The $NO_x$ purification ratio tends to decrease as the exhaust gas flow rate increases and increase as the temperature of the SCR catalyst increases (and decrease as the temperature of the SCR catalyst increases once the temperature of the SCR catalyst exceeds an upper limit temperature (such as 350° C.)). Accordingly, the $NO_x$ purification ratio may be obtained based on a map or a function obtained in advance to define the relationship illustrated in FIG. 5.

The ammonia adsorption amount calculation processing described above is initiated before the reflux of the EGR gas is initiated after the internal combustion engine 1 is started. Then, the ammonia adsorption amount calculation processing described above is repeatedly executed at predetermined intervals. A value that is obtained in the previous calculation processing (previous value) is used as the ammonia adsorption amount which is used in the calculation of the slip amount Anh3slp.

Next, the ECU 10 calculates the ammonia reflux amount by using the ammonia slip amount Anh3slp and the ratio of the amount of the EGR gas to the exhaust gas flow rate as parameters. In this case, the ratio of the amount of the EGR gas to the exhaust gas flow rate can be calculated from an EGR ratio and the output signal of the air flow meter 11 (the amount of suctioned air).

In the processing of S104, the ECU 10 determines whether or not the ammonia reflux amount that is obtained in the processing of S103 exceeds the upper limit value. The ECU 10 allows the processing to proceed to S105 and sets "1" to a prohibition flag in the case of a positive determination in the processing of S104. In the case of a negative determination in the processing of S104, the ECU 10 allows the processing to proceed to S106 and sets "0" to the prohibition flag. The prohibition flag is a storage region that is set in advance in the RAM or the backup RAM. The ECU 10 refers to the prohibition flag during the execution of the SCR catalyst abnormality diagnosis. The ECU 10 executes the SCR catalyst abnormality diagnosis in a case where "0" is set to the prohibition flag and does not execute the SCR catalyst abnormality diagnosis processing in a case where "1" is set to the prohibition flag.

The prohibiting means according to the invention is realized by the ECU 10 executing the processing routine that is illustrated in FIG. 3 as described above. As a result, the SCR catalyst abnormality diagnosis is not executed in a case where the amount of ammonia suctioned into the internal combustion engine 1 along with the EGR gas is large to the point of causing an erroneous diagnosis. Accordingly, an erroneous diagnosis in which the SCR catalyst is diagnosed to be abnormal despite the SCR catalyst being normal can be suppressed and the SCR catalyst abnormality diagnosis can be more accurately performed.

Abnormality diagnosis processing regarding the urea water solution can be accurately executed when the SCR catalyst abnormality diagnosis is accurately performed. The "abnormality diagnosis processing regarding the urea water solution" is processing for diagnosing whether or not a concentration of urea contained in the urea water solution is below a lower limit value. When the concentration of the urea that is contained in the urea water solution is excessively low, the amount of ammonia supplied to the SCR catalyst might be excessively low and the amount of $NO_x$ not removed by the SCR catalyst might be excessively large. In a case where a urea water solution injection quantity is feedback-controlled based on a difference between the $NO_x$ purification ratio of the SCR catalyst and a target value, the urea water solution injection quantity might be excessively large and the amount of urea water solution consumption might be excessively large.

An abnormality regarding the urea water solution is diagnosed by the use of the $NO_x$ purification ratio pertaining to a case where the urea water solution injection quantity is allowed to exceed the target value to deal with these problems as a parameter. For example, the ammonia slip amount increases when the concentration of the urea that is contained in the urea water solution is equal to or higher than the lower limit value. Herein, the $NO_x$ sensor 12 has the property of reacting with ammonia as well as the $NO_x$ in the exhaust gas. Accordingly, the output signal of the $NO_x$ sensor 12 becomes stronger in the case of an increase in the ammonia slip amount. The $NO_x$ purification ratio Enox that is obtained by the above-described Equation (1) is reduced when the output signal of the $NO_x$ sensor 12 becomes stronger.

When the concentration of the urea that is contained in the urea water solution is below the lower limit value, the ammonia slip amount rarely increases and the ammonia adsorption amount of the SCR catalyst increases. As a result, the output signal of the $NO_x$ sensor 12 remains as it is or becomes weaker. Accordingly, the $NO_x$ purification ratio Enox that is obtained by the above-described Equation (1) is rarely changes or rises.

Accordingly, the abnormality regarding the urea water solution can be more accurately diagnosed when the abnormality diagnosis processing regarding the urea water solution is executed in a case where it is diagnosed that the SCR catalyst is normal as a result of the SCR catalyst abnormality diagnosis processing.

When the abnormality diagnosis processing regarding the urea water solution is executed by the above-described method, the amount of ammonia flowing out from the SCR catalyst increases in a case where the urea water solution is normal, and thus a relatively large amount of ammonia might be discharged into the atmosphere as a result thereof. In this regard, the abnormality diagnosis device for an exhaust gas control apparatus according to this embodiment operates the EGR device 9 (opens the EGR valve 91) in a case where the abnormality diagnosis processing regarding the urea water solution is executed when the EGR device 9 is not in operation or increases the EGR ratio in a case where the abnormality diagnosis processing regarding the urea water solution is executed when the EGR device 9 is in operation. When this method is employed, the abnormality diagnosis processing regarding the urea water solution can be executed while the amount of ammonia discharged into the atmosphere is reduced.

In the example of this embodiment described above, the SCR catalyst abnormality diagnosis is prohibited in a case where the amount of ammonia flowing back along with the EGR gas exceeds the upper limit value. However, the SCR catalyst abnormality diagnosis may also be prohibited in a case where the amount of ammonia flowing back along with the EGR gas exceeds zero. In addition, the SCR catalyst abnormality diagnosis may also be prohibited when a condition that allows an estimation that the amount of ammonia flowing back along with the EGR gas increases (for example, at least one of conditions such as the temperature of the SCR catalyst being equal to or higher than a certain temperature, the exhaust gas flow rate being equal to or higher than a certain flow rate, the ammonia adsorption amount of the SCR catalyst being equal to or larger than a certain adsorption amount, and the EGR ratio being equal to or higher than a certain value) is satisfied.

Figure 6:
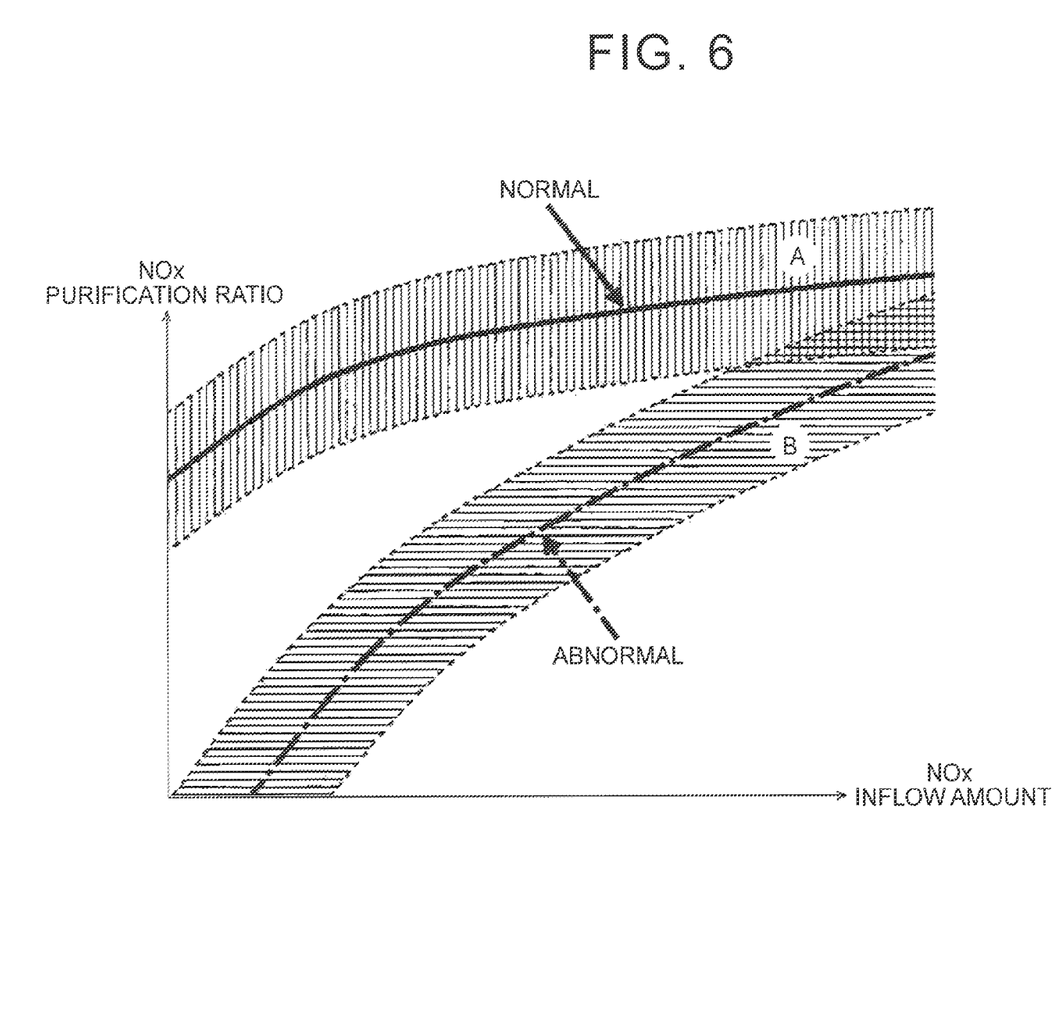
FIG. 6 is a drawing illustrating a relationship between a value that a calculated value of the $NO_x$ purification ratio can have when the SCR catalyst is normal and a value that the calculated value of the $NO_x$ purification ratio can have when the SCR catalyst is abnormal.

In the example of this embodiment described above, the $NO_x$ inflow amount that is used for SCR catalyst fault diagnosis is calculated from a parameter showing the operation state of the internal combustion engine 1. However, the $NO_x$ inflow amount may also be calculated from a value measured by a $NO_x$ sensor. A relationship between the $NO_x$ inflow amount and the $NO_x$ purification ratio is illustrated in FIG. 6. The solid line in FIG. 6 represents the $NO_x$ purification ratio in the case of normality and the one-dot chain line in FIG. 6 represents the $NO_x$ purification ratio in the case of an abnormality. In FIG. 6, the region A that includes the solid line and the region B that includes the one-dot chain line represent ranges of a value that a calculated value of the $NO_x$ purification ratio calculated by the use of the value measured by the $NO_x$ sensor as a parameter can have and mean a measurement error of the $NO_x$ sensor. As illustrated in FIG. 6, the region A and the region B do not overlap each other when the $NO_x$ inflow amount is relatively small, and thus a threshold comparable to the calculated value of the $NO_x$ purification ratio can be set. When the $NO_x$ inflow amount is relatively large, however, the region A and the region B overlap each other, and thus the threshold comparable to the calculated value of the $NO_x$ purification ratio cannot be set. Accordingly, it is desirable that the SCR catalyst abnormality diagnosis is prohibited in a case where the region A and the region B overlap each other.

The minimum ammonia reflux amount allowing the region A and the region B to overlap each other may be set as an upper limit value and the SCR catalyst abnormality diagnosis may be prohibited in a case where the ammonia reflux amount exceeds the upper limit value. In addition, the minimum $NO_x$ inflow amount allowing the region A and the region B to overlap each other may be set as an upper limit value and the SCR catalyst abnormality diagnosis may be prohibited in a case where the value measured by the $NO_x$ sensor exceeds the upper limit value. According to these methods, a reduction in the accuracy of the SCR catalyst abnormality diagnosis can be suppressed even in a configuration in which each of the $NO_x$ inflow amount and the $NO_x$ outflow amount is calculated from the value measured by the $NO_x$ sensor.

Figure 7:
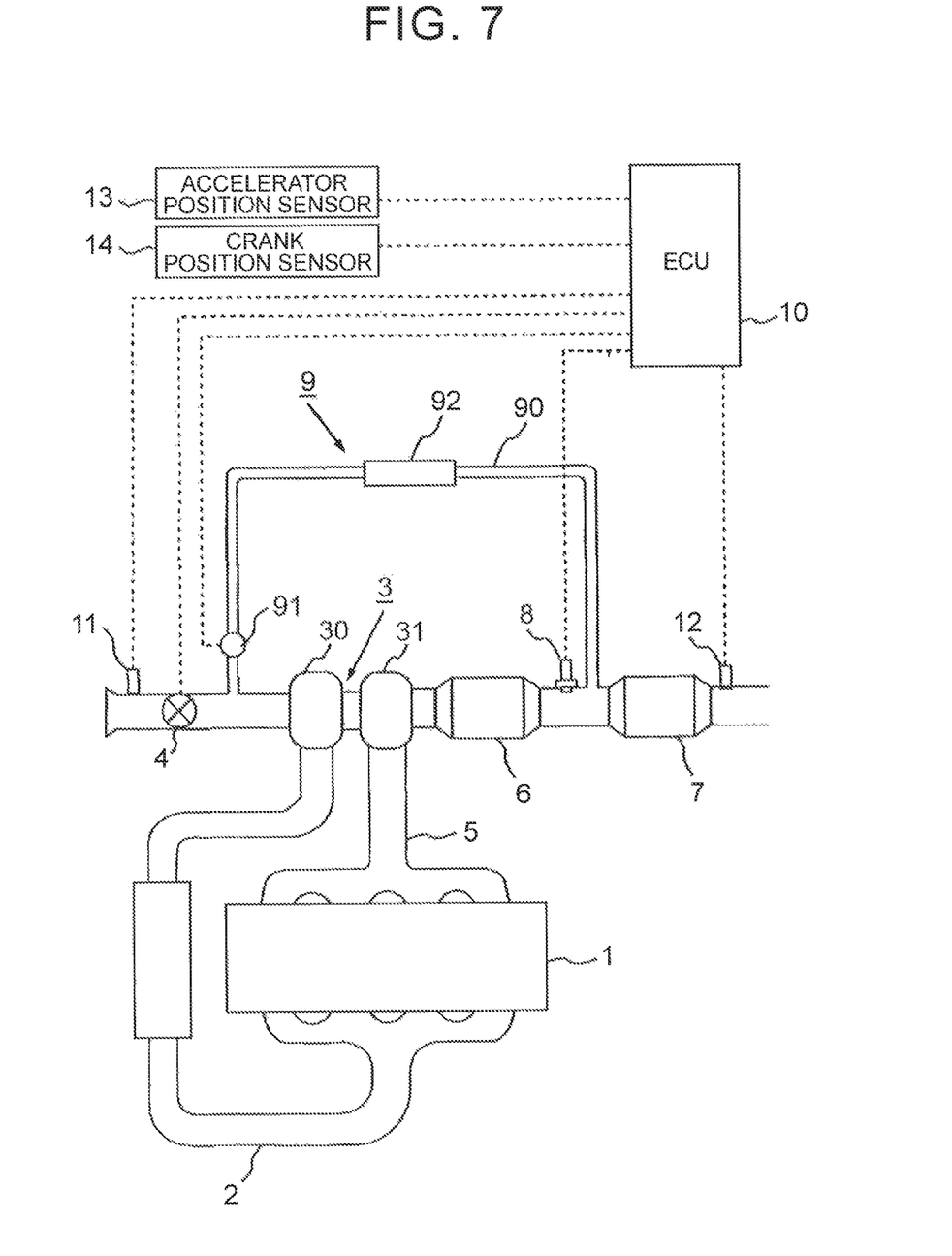
FIG. 7 is a drawing illustrating another configuration example of the internal combustion engine to which the invention is applied and the intake and exhaust systems thereof.

In the example of this embodiment described above, the base end (upstream end portion) of the EGR passage 90 is connected to the exhaust passage 5 further downstream than the second catalyst casing 7. However, the base end of the EGR passage 90 may also be connected to the exhaust passage 5 between the adding valve 8 and the second catalyst casing 7 as illustrated in FIG. 7. In this case, the ammonia reflux amount may be calculated by the use of the amount of the urea water solution injected from the adding valve 8 and the ratio of the amount of the EGR gas to the exhaust gas flow rate as parameters.

REFERENCE SIGNS LIST

1 . . . INTERNAL COMBUSTION ENGINE, 2 . . . INTAKE PASSAGE, 3 . . . TURBOCHARGER, 4 . . . INTAKE THROTTLE VALVE, 5 . . . EXHAUST PASSAGE, 6 . . . FIRST CATALYST CASING, 7 . . . SECOND CATALYST CASING, 8 . . . ADDING VALVE, 9 . . . EGR DEVICE, 10 . . . ECU, 11 . . . AIR FLOW METER, 12 . . . $NO_x$ SENSOR, 30 . . . COMPRESSOR, 31 . . . TURBINE, 90 . . . EGR PASSAGE, 91 . . . EGR VALVE, 92 . . . EGR COOLER

The invention claimed is:

1. An abnormality diagnosis device for an exhaust gas control apparatus, the exhaust gas control apparatus being placed in an exhaust passage of an internal combustion engine and the exhaust gas control apparatus including a selective catalytic reduction catalyst, the internal combustion engine including:
a supply device configured to supply an additive to the exhaust gas control apparatus, the additive being ammonia or a precursor of the ammonia; and
an EGR device configured to allow some of exhaust gas to flow back from the exhaust passage to an intake passage, the exhaust passage being further downstream than a position of the supply of the additive by the supply device,
the abnormality diagnosis device comprising an electronic control unit configured to:
i) acquire a $NO_x$ inflow amount as the amount of $NO_x$ flowing into the exhaust gas control apparatus,
ii) diagnose an abnormality of the exhaust gas control apparatus by using the acquired $NO_x$ inflow amount as a parameter in a case where the exhaust gas is not allowed to flow back by the EGR device, and
iii) prohibit the abnormality diagnosis regarding the exhaust gas control apparatus in a case where some of the exhaust gas is allowed to flow back by the EGR device and the amount of the additive flowing back along with the exhaust gas exceeds an upper limit value.

2. The abnormality diagnosis device according to claim 1, wherein the electronic control unit is configured to calculate the $NO_x$ inflow amount by using a parameter showing an operation state of the internal combustion engine.

3. The abnormality diagnosis device according to claim 1, wherein the electronic control unit is configured to acquire the $NO_x$ inflow amount by using a $NO_x$ sensor placed further upstream than the exhaust gas control apparatus in the exhaust passage.

4. The abnormality diagnosis device according to claim 1, wherein the electronic control unit is configured to
i) calculate the amount of the additive allowed to flow back along with the exhaust gas by using the amount of the additive flowing out from the exhaust gas control apparatus and a ratio of the amount of the exhaust gas allowed to flow back by the EGR device to the amount of the exhaust gas flowing out from the exhaust gas control apparatus as parameters, and
ii) prohibit the abnormality diagnosis regarding the exhaust gas control apparatus in a case where a result of the calculation exceeds the upper limit value.

* * * * *